US012059029B2

(12) United States Patent
Lee

(10) Patent No.: US 12,059,029 B2
(45) Date of Patent: Aug. 13, 2024

(54) AEROSOL GENERATING DEVICE WITH A CUTTING PORTION

(71) Applicant: KT&G CORPORATION, Daejeon (KR)

(72) Inventor: Moon Bong Lee, Seoul (KR)

(73) Assignee: KT&G CORPORATION, Daejeon (KR)

( * ) Notice: Subject to any disclaimer, the term of this patent is extended or adjusted under 35 U.S.C. 154(b) by 653 days.

(21) Appl. No.: 17/272,703

(22) PCT Filed: Dec. 10, 2020

(86) PCT No.: PCT/KR2020/018035
§ 371 (c)(1),
(2) Date: Mar. 2, 2021

(87) PCT Pub. No.: WO2021/141251
PCT Pub. Date: Jul. 15, 2021

(65) Prior Publication Data

US 2022/0408806 A1 Dec. 29, 2022

(30) Foreign Application Priority Data

Jan. 6, 2020 (KR) ........................ 10-2020-0001706
Mar. 6, 2020 (KR) ........................ 10-2020-0028582

(51) Int. Cl.
*A24F 40/40* (2020.01)
*A24D 1/02* (2006.01)
(Continued)

(52) U.S. Cl.
CPC ................ *A24F 40/40* (2020.01); *A24D 1/02* (2013.01); *A24D 1/20* (2020.01); *A24F 40/20* (2020.01);
(Continued)

(58) Field of Classification Search
CPC .. A24D 1/02; A24D 1/20; A24F 40/20; A24F 40/40; A24F 40/50; A24F 40/60; B26D 1/025
See application file for complete search history.

(56) References Cited

U.S. PATENT DOCUMENTS 4,947,874 A 8/1990 Brooks et al.
5,526,559 A 6/1996 Fleenor et al.
(Continued)

FOREIGN PATENT DOCUMENTS

CA 3 099 825 A1 11/2019
CN 1045691 A 10/1990
(Continued)

OTHER PUBLICATIONS

Office Action dated Apr. 15, 2023 from the Chinese Patent Office in Application No. 202080006550.8.
(Continued)

*Primary Examiner* — Abdullah A Riyami
*Assistant Examiner* — Thang H Nguyen
(74) *Attorney, Agent, or Firm* — Sughrue Mion, PLLC

(57) ABSTRACT

An aerosol generating device that heats an aerosol generating article including a metal wrapper, the aerosol generating device includes: an accommodation portion configured to accommodate the aerosol generating article through an opening of the aerosol generating device; and a cutting portion disposed in the accommodation portion. The cutting portion may cut at least part of the metal wrapper when the aerosol generating article is inserted into the accommodation portion.

14 Claims, 13 Drawing Sheets

(51) Int. Cl.

| | |
|---|---|
| ***A24D 1/20*** | (2020.01) |
| ***A24F 40/20*** | (2020.01) |
| ***A24F 40/50*** | (2020.01) |
| ***A24F 40/60*** | (2020.01) |
| ***B26D 1/02*** | (2006.01) |

(52) U.S. Cl.
CPC .............. *A24F 40/50* (2020.01); *A24F 40/60* (2020.01); *B26D 1/025* (2013.01)

(56) References Cited

U.S. PATENT DOCUMENTS

| | | | | |
|---|---|---|---|---|
| 8,689,804 | B2 | 4/2014 | Fernando et al. | |
| 9,814,265 | B2 * | 11/2017 | Rinker | A24F 40/46 |
| 10,729,178 | B2 | 8/2020 | Reevell | |
| 10,869,499 | B2 | 12/2020 | Fernando et al. | |
| 10,912,330 | B2 * | 2/2021 | Malgat | A24F 40/00 |
| 10,918,136 | B2 | 2/2021 | Reevell | |
| 10,993,473 | B2 | 5/2021 | Malgat et al. | |
| 11,178,910 | B2 * | 11/2021 | Kim | A24F 40/44 |
| 11,330,835 | B2 | 5/2022 | Lavanchy | |
| 2011/0192408 | A1 | 8/2011 | Inagaki et al. | |
| 2015/0013696 | A1 | 1/2015 | Plojoux et al. | |
| 2016/0302488 | A1 | 10/2016 | Fernando et al. | |
| 2017/0055581 | A1 | 3/2017 | Wilke et al. | |
| 2017/0071251 | A1 | 3/2017 | Goch | |
| 2017/0143039 | A1 | 5/2017 | Buehler et al. | |
| 2017/0191020 | A1 | 7/2017 | Recht et al. | |
| 2017/0196268 | A1 | 7/2017 | Reevell | |
| 2017/0231277 | A1 | 8/2017 | Mironov et al. | |
| 2017/0340008 | A1 | 11/2017 | Sebastian et al. | |
| 2018/0220713 | A1 | 8/2018 | Chang et al. | |
| 2018/0228213 | A1 | 8/2018 | Buehler et al. | |
| 2018/0242638 | A1 | 8/2018 | Godfrey et al. | |
| 2019/0000141 | A1 | 1/2019 | Rojo-Calderon et al. | |
| 2019/0014820 | A1 | 1/2019 | Malgat | |
| 2019/0045844 | A1 * | 2/2019 | Reevell | A61M 15/06 |
| 2019/0230989 | A1 | 8/2019 | Fursa et al. | |
| 2019/0261684 | A1 | 8/2019 | Reevell | |
| 2020/0093185 | A1 | 3/2020 | Lim | |
| 2020/0154765 | A1 | 5/2020 | Lee et al. | |
| 2020/0196665 | A1 * | 6/2020 | Bilat | B67D 7/426 |
| 2020/0232766 | A1 | 7/2020 | Flick | |
| 2020/0260790 | A1 * | 8/2020 | Kaufman | G01D 5/24 |
| 2020/0305508 | A1 * | 10/2020 | Talon | A24F 40/50 |
| 2020/0316325 | A1 * | 10/2020 | Reevell | A61M 15/06 |
| 2021/0007400 | A1 | 1/2021 | Liu et al. | |
| 2021/0237214 | A1 | 8/2021 | Guenther et al. | |
| 2021/0259319 | A1 * | 8/2021 | Rogan | A24F 40/465 |
| 2022/0030939 | A1 * | 2/2022 | Lavanchy | A24D 1/20 |
| 2024/0023600 | A1 * | 1/2024 | Kawasaki | A24D 1/20 |

FOREIGN PATENT DOCUMENTS

| | | | | |
|---|---|---|---|---|
| CN | 106455726 | A | 2/2017 | |
| CN | 106929402 | A | 7/2017 | |
| CN | 107713009 | A | 2/2018 | |
| CN | 107775187 | A | 3/2018 | |
| CN | 107846978 | A | 3/2018 | |
| CN | 107949287 | A | 4/2018 | |
| CN | 108366618 | A | 8/2018 | |
| CN | 108601396 | A | 9/2018 | |
| CN | 109363243 | A | 2/2019 | |
| CN | 109640717 | A | 4/2019 | |
| CN | 209498553 | U | 10/2019 | |
| DE | 20 2014 001 718 | U1 | 7/2015 | |
| EP | 2 468 118 | A1 | 6/2012 | |
| EP | 3 175 721 | A1 | 6/2017 | |
| EP | 3 574 774 | A1 | 12/2019 | |
| EP | 3 718 419 | A1 | 10/2020 | |
| EP | 3 831 223 | A1 | 6/2021 | |
| GB | 2 259 135 | A | 3/1993 | |
| JP | 9-222361 | A | 8/1997 | |
| JP | 11-6767 | A | 1/1999 | |
| JP | 11-178561 | A | 7/1999 | |
| JP | 2018-527918 | A | 9/2018 | |
| JP | 2019-506855 | A | 3/2019 | |
| KR | 10-0889660 | B1 | 3/2009 | |
| KR | 10-2011-0096548 | A | 8/2011 | |
| KR | 10-2013-0001750 | A | 1/2013 | |
| KR | 10-2014-0067691 | A | 6/2014 | |
| KR | 10-2014-0084769 | A | 7/2014 | |
| KR | 10-2014-0121381 | A | 10/2014 | |
| KR | 10-2015-0144089 | A | 12/2015 | |
| KR | 10-2016-0096585 | A | 8/2016 | |
| KR | 10-1776966 | B1 | 9/2017 | |
| KR | 10-2018-0056643 | A | 5/2018 | |
| KR | 10-2018-0099674 | A | 9/2018 | |
| KR | 10-2018-0100319 | A | 9/2018 | |
| KR | 10-2018-0120166 | A | 11/2018 | |
| KR | 10-2018-0129637 | A | 12/2018 | |
| KR | 10-2019-0011721 | A | 2/2019 | |
| KR | 10-2019-0012150 | A | 2/2019 | |
| KR | 10-1971169 | B1 | 4/2019 | |
| KR | 10-2019-0051745 | A | 5/2019 | |
| KR | 10-2019-0129757 | A | 11/2019 | |
| KR | 10-2019-0134855 | A | 12/2019 | |
| KR | 10-2019-0143177 | A | 12/2019 | |
| KR | 10-2020-0000635 | A | 1/2020 | |
| TW | 201618682 | A | 6/2016 | |
| WO | WO-9920940 | A1 * | 4/1999 | A24D 1/20 |
| WO | 2016/026811 | A1 | 2/2016 | |
| WO | 2017/114895 | A1 | 7/2017 | |
| WO | 2017/118557 | A1 | 7/2017 | |
| WO | 2018/050701 | A1 | 3/2018 | |
| WO | 2018/190606 | A1 | 10/2018 | |
| WO | 2019/090200 | A1 | 5/2019 | |
| WO | 2019/129378 | A1 | 7/2019 | |
| WO | 2019/197413 | A1 | 10/2019 | |
| WO | 2019/224310 | A1 | 11/2019 | |

OTHER PUBLICATIONS

Office Action dated Apr. 14, 2023 from the Chinese Patent Office in Application No. 202080006484.4.
Office Action dated Apr. 17, 2023 from the Chinese Patent Office in Application No. 202080006491.4.
International Search Report dated Mar. 16, 2021 from the International Searching Authority in International Application No. PCT/KR2020/018035.
International Search Report dated Mar. 16, 2021 from the International Searching Authority in International Application No. PCT/KR2020/017923.
International Search Report dated Mar. 17, 2021 from the International Searching Authority in International Application No. PCT/KR2020/018171.
Office Action issued Dec. 15, 2021 in Korean Application No. 10-2020-0028582.
Office Action issued Dec. 15, 2021 in Korean Application No. 10-2020-0041537.
Office Action issued Dec. 17, 2021 in Korean Application No. 10-2020-0047420.
Extended European Search Report issued Nov. 5, 2021 in European Application No. 20855894.0.
Extended European Search Report issued Oct. 15, 2021 in European Application No. 20866967.1.
Extended European Search Report issued Dec. 8, 2021 in European Application No. 20866966.3.
Office Action issued Jun. 21, 2022 in Korean Application No. 10-2020-0041538.
Office Action issued Jul. 19, 2022 in Japanese Application No. 2021-534382.
Office Action issued Jul. 12, 2022 in Japanese Application No. 2021-529309.
Tong Ying, "Research on the Key Technologies of Stereo Vision Based on Infrared and Visible Dual Band Images", China Doctoral Dissertation Full Text Database Information Technology Series, Tianjin University, 2015 (122 pages total).
Office Action issued Sep. 26, 2023 in Chinese Application No. 202080006491.4.

(56) References Cited

OTHER PUBLICATIONS

European Office Action dated Mar. 13, 2024 in Application No. 20 866 967.1.

* cited by examiner

AEROSOL GENERATING DEVICE WITH A CUTTING PORTION

CROSS REFERENCE TO RELATED APPLICATIONS

This application is a National Stage of International Application No. PCT/KR2020/018035 filed on Dec. 10, 2020, claiming priority based on Korean Patent Application No. 10-2020-0001706 filed on Jan. 6, 2020 and Korean Patent Application No. 10-2020-0028582 filed on Mar. 6, 2020.

TECHNICAL FIELD

One or more embodiments of the present disclosure relate to an aerosol generating device, and more particularly, to an aerosol generating device including a cutting portion for cutting at least part of a metal wrapper of an aerosol generating article.

BACKGROUND ART

Recently, the demand for alternative methods to overcome the shortcomings of general cigarettes has increased. For example, there is an increasing demand for a method of generating aerosols by heating an aerosol generating material, rather than by combusting cigarettes. Accordingly, studies on a heating-type cigarette or a heating-type aerosol generating device have been actively conducted.

DISCLOSURE OF INVENTION

Technical Problem

Users may insert an aerosol generating article into an aerosol generating device to be used. Generally, an aerosol generating article manufactured for single use is first inserted into an aerosol generating device and then discarded.

However, some users insert the aerosol generating article first and re-insert it and use it again without discarding it. The reuse of the aerosol generating article may cause discomfort to the user by changing the flavor of an aerosol generated from the aerosol generating article.

Solution to Problem

Thus, it is advantageous to prevent the flavor of the aerosol from being changed by preventing the reuse of an aerosol generating article, and configurations and methods for this may be applied to an aerosol generating article and/or an aerosol generating device.

One or more embodiments of the present disclosure include an aerosol generating device in which at least part of a metal wrapper of an aerosol generating article may be cut to prevent the reuse of the aerosol generating article.

One or more embodiments of the present disclosure include an aerosol generating system including an aerosol generating article and the aerosol generating device.

According to one or more embodiments, an aerosol generating device that heats an aerosol generating article including a metal wrapper, may be provided. The aerosol generating device includes: an accommodation portion configured to accommodate the aerosol generating article through an opening of the aerosol generating device; and a cutting portion disposed in the accommodation portion, wherein the cutting portion is configured to cut at least part of the metal wrapper when the aerosol generating article is inserted into the accommodation portion.

According to an embodiment, the metal wrapper includes an aluminum foil.

According to an embodiment, an end of the cutting portion is provided such that, when the aerosol generating article is fully inserted into the accommodation portion, the end of the cutting portion is closer to the opening than the metal wrapper.

According to an embodiment, the cutting portion includes a pair of cutting portions in the accommodation portion.

According to an embodiment, the cutting portion is formed in the accommodation portion by a double shot injection molding.

According to an embodiment, an end of the cutting portion is located to face the opening of the accommodation portion.

According to an embodiment, the cutting portion is exposed when the aerosol generating article is inserted into the aerosol generating device.

According to an embodiment, the cutting portion is configured to come into contact with the metal wrapper and cut at least a part of the metal wrapper when the aerosol generating article is first inserted into the accommodation portion, such that a normal use signal is generated.

According to an embodiment, the aerosol generating device further includes a controller electrically connected to the cutting portion to receive an electrical signal from the cutting portion, wherein the controller is configured to determine that the normal use signal is received based on the electrical signal including an electrical current for a predetermined time or longer, or an amount of the electrical current with a predetermined value or more.

According to an embodiment, the aerosol generating device further includes a controller electrically connected to the cutting portion to receive the normal use signal from the cutting portion, wherein the controller is configured to determine that the normal use signal is received.

According to an embodiment, the controller is further configured to block operation of the aerosol generating device based on not receiving the normal use signal.

According to an embodiment, the controller is further configured to generate an alarm signal notifying a user of reuse of the aerosol generating article based on not receiving the normal use signal.

According to an embodiment, the aerosol generating device further includes an alarm unit including at least one from among a vibration unit, a speaker unit, and a display unit, wherein the alarm unit transmits to the user at least one from among vibration, sound, and an optical output according to the alarm signal of the controller.

According to an embodiment, the cutting portion is configured to cut the part of the metal wrapper when the aerosol generating article is first inserted into the accommodation portion such that, in a case where the aerosol generating article is removed and reinserted into the aerosol generating device, another signal that is different from the normal use signal is generated, and the controller is further configured to receive the another signal and block operation of the aerosol generating device based on receiving the another signal.

According to one or more embodiments, an aerosol generating system is provided. The aerosol generating system includes: the aerosol generating device according to an embodiment of the present disclosure; and an aerosol generating article accommodated in the aerosol generating device and including a metal wrapper.

Technical solutions to be solved through embodiments are not limited to the above-described technical solutions, and other technical solutions may be inferred from the following embodiments.

Advantageous Effects of Invention

In an aerosol generating device according to one or more embodiments of the present disclosure, when an aerosol generating article is first inserted, at least part of a metal wrapper is cut so that the re-insertion and reuse of the aerosol generating article may be detected. In this case, re-insertion and reuse of the aerosol generating article may be detected by measuring electrical signals according to contact between the metal wrapper and the cutting portion.

When the reuse of the aerosol generating article is detected, the aerosol generating device may be blocked from operation. Alternatively, the reuse of the aerosol generating article may be notified to a user through an alarm unit installed in the aerosol generating device.

The reuse of the aerosol generating article is blocked so that flavor, that causes discomfort, that may be generated due to the reuse may be prevented from being delivered to the user. A reduction of the user's satisfaction, due to changes in the flavor of aerosol, may be prevented.

BEST MODE FOR CARRYING OUT THE INVENTION

Figure 1:
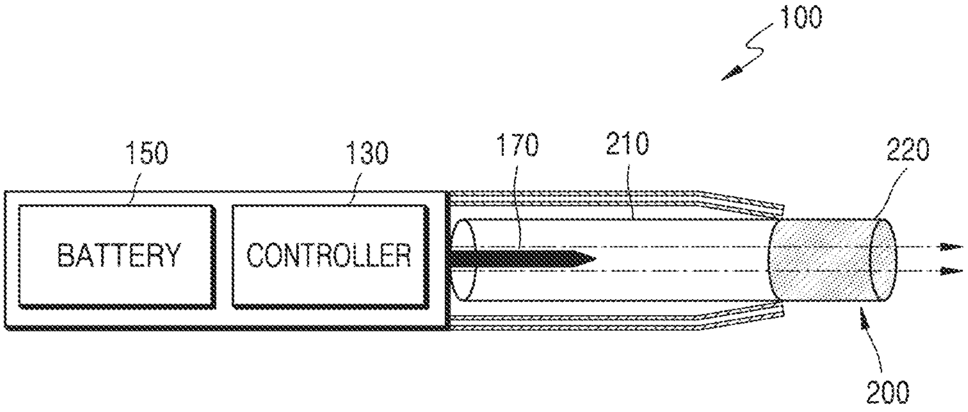
FIG. 1 is a diagram showing an example in which an aerosol generating article is inserted into an aerosol generating device according to an embodiment.

With respect to the terms used to describe the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used to describe the various embodiments should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

Since various embodiments described in the specification are classified arbitrarily only for the purpose of explanation, the embodiments should not be construed to be exclusive to each other. For example, some features disclosed in one embodiment may be applied to or implemented in other embodiments. Also, it is possible to change some features for applying or implement those features in other embodiments within scope and spirit of this disclosure.

In addition, terms used in the present specification are for describing the embodiments and are not intended to limit the embodiments. In the present specification, the singular form also includes the plurality form unless specifically stated in a phrase.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Throughout the specification, the "longitudinal direction" of a component may be a direction in which the component extends along an axis in one direction of the component, wherein the axis in the one direction of the component extends longer than an axis in another direction of the component crossing the axis in the one direction of the component.

Hereinafter, embodiments of the present disclosure will now be described more fully with reference to the accompanying drawings, such that one of ordinary skill in the art may easily work the present disclosure. Embodiments of the present disclosure may, however, be embodied in many different forms and should not be construed as being limited to the embodiments set forth herein.

Figure 2:
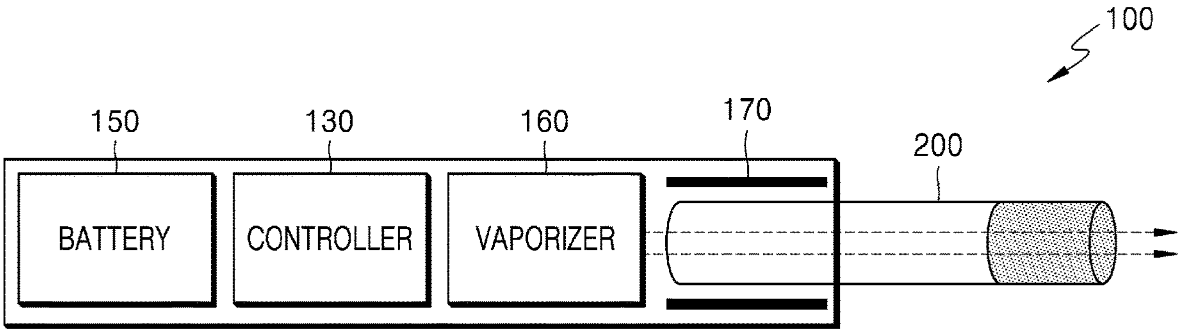
FIG. 2 is a diagram showing an example in which an aerosol generating article is inserted into an aerosol generating device according to an embodiment.
Figure 3:
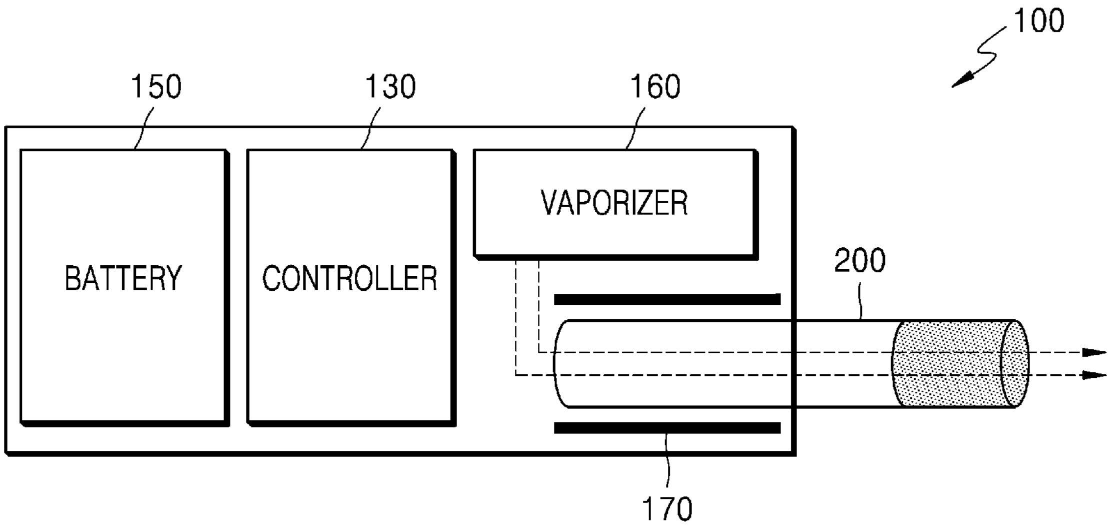
FIG. 3 is a diagram showing an example in which an aerosol generating article is inserted into an aerosol generating device according to an embodiment.

FIGS. 1 through 3 are diagrams showing examples in which an aerosol generating article is inserted into an aerosol generating device.

Referring to FIG. 1, the aerosol generating device 100 may include a battery 150, a controller 130, and a heater 170. Referring to FIGS. 2 and 3, the aerosol generating device 100 may further include a vaporizer 160. Also, the aerosol generating article 200 may be inserted into an inner space of the aerosol generating device 100.

FIGS. 1 through 3 illustrate components of the aerosol generating device 100, which are related to the present embodiment. It will be understood by one of ordinary skill in the art that other general-purpose components may be further included in the aerosol generating device 100, in addition to the components illustrated in FIGS. 1 through 3.

Also, FIGS. 2 and 3 illustrate that the aerosol generating device 100 includes the heater 170. However, in some embodiments, the heater 170 may be omitted.

FIG. 1 illustrates that the battery 150, the controller 130, and the heater 170 are arranged in series. Also, FIG. 2 illustrates that the battery 150, the controller 130, the vaporizer 160, and the heater 170 are arranged in series. Also, FIG. 3 illustrates that the vaporizer 160 and the heater 170 are arranged in parallel. However, the internal structure of the aerosol generating device 100 is not limited to the structures illustrated in FIGS. 1 through 3. In other words, according to the design of the aerosol generating device 100, the battery 150, the controller 130, the heater 170, and the vaporizer 160 may be differently arranged.

When the aerosol generating article 200 is inserted into the aerosol generating device 100, the aerosol generating device 100 may operate the heater 170 and/or the vaporizer 160 to generate an aerosol from the aerosol generating article 200 and/or the vaporizer 160. The aerosol generated by the heater 170 and/or the vaporizer 160 is delivered to a user by passing through the aerosol generating article 200.

According to some embodiments, even when the aerosol generating article 200 is not inserted into the aerosol generating device 100, the aerosol generating device 100 may heat the heater 170.

The battery 150 may supply power to be used by the aerosol generating device 100 to operate. For example, the battery 150 may supply power to heat the heater 170 or the vaporizer 160, and may supply power for operating the controller 130. Also, the battery 150 may supply power for operations of a display, a sensor, a motor, etc. mounted in the aerosol generating device 100.

The controller 130 may generally control operations of the aerosol generating device 100. In detail, the controller 130 may control not only operations of the battery 150, the heater 170, and the vaporizer 160, but also operations of other components included in the aerosol generating device 100. Also, the controller 130 may check a state of each of the components of the aerosol generating device 100 to determine whether or not the aerosol generating device 100 is able to operate.

The controller 130 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 170 may be heated by the power supplied from the battery 150. For example, when the aerosol generating article 200 is inserted into the aerosol generating device 100, the heater 170 may be located outside (e.g. around) the aerosol generating article 200. Thus, the heater 170, by heating, may increase a temperature of an aerosol generating material in the aerosol generating article 200.

The heater 170 may include an electro-resistive heater. For example, the heater 170 may include an electrically conductive track, and the heater 170 may be heated when currents flow through the electrically conductive track. However, the heater 170 is not limited to the example described above and may include all heaters which may be heated to a desired temperature. Here, the desired temperature may be pre-set in the aerosol generating device 100 or may be set as a temperature desired by a user.

As another example, the heater 170 may include an induction heater. In detail, the heater 170 may include an electrically conductive coil for heating an aerosol generating article in an induction heating method, and the aerosol generating article may include a susceptor which may be heated by the induction heater.

For example, the heater 170 may include a tube-type heating element, a plate-type heating element, a needle-type heating element, or a rod-type heating element, and may heat the inside or the outside of the aerosol generating article 200, according to the shape of the heating element.

Also, the aerosol generating device 100 may include a plurality of the heater 170. Here, the plurality of the heater 170 may be inserted into the aerosol generating article 200 or may be arranged outside the aerosol generating article 200, Also, some of the plurality of the heater 170 may be inserted into the aerosol generating article 200 and the others may be arranged outside the aerosol generating article 200. In addition, the shape of the heater 170 is not limited to the shapes illustrated in FIGS. 1 through 3 and may include various shapes.

The vaporizer 160 may generate an aerosol by heating a liquid composition and the generated aerosol may pass through the aerosol generating article 200 to be delivered to a user. In other words, the aerosol generated via the vaporizer 160 may move along an air flow passage of the aerosol generating device 100 and the air flow passage may be configured such that the aerosol generated via the vaporizer 160 passes through the aerosol generating article 200 to be delivered to the user.

For example, the vaporizer 160 may include a liquid storage, a liquid delivery element, and a heating element, but it is not limited thereto. For example, the liquid storage, the liquid delivery element, and the heating element may be included in the aerosol generating device 100 as independent modules.

The liquid storage may store a liquid composition. For example, the liquid composition may be a liquid including a tobacco-containing material having a volatile tobacco flavor component, or a liquid including a non-tobacco material. The liquid storage may be formed to be attached/detached to/from the vaporizer 160 or may be formed integrally with the vaporizer 160.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 160 may be referred to as a cartomizer or an atomizer, but it is not limited thereto.

The aerosol generating device 100 may further include general-purpose components in addition to the battery 150, the controller 130, the heater 170, and the vaporizer 160. For example, the aerosol generating device 100 may include a display capable of outputting visual information and/or a motor for outputting haptic information. Also, the aerosol generating device 100 may include at least one sensor (e.g. a puff detecting sensor, a temperature detecting sensor, an aerosol generating article insertion detecting sensor, etc.). Also, the aerosol generating device 100 may be formed as a structure where, even when the aerosol generating article 200 is inserted into the aerosol generating device 100, external air may be introduced or internal air may be discharged.

Although not illustrated in FIGS. 1 through 3, the aerosol generating device 100 and an additional cradle may together form a system. For example, the cradle may be used to charge the battery 150 of the aerosol generating device 100. Alternatively, the heater 170 may be heated when the cradle and the aerosol generating device 100 are coupled to each other.

The aerosol generating article 200 may be similar to a general combustive aerosol generating article. For example, the aerosol generating article 200 may be divided into a first portion including an aerosol generating material and a second portion including a filter, etc. Alternatively, the second portion of the aerosol generating article 200 may also include an aerosol generating material. For example, an aerosol generating material made in the form of granules or capsules may be inserted into the second portion.

The entire first portion may be inserted into the aerosol generating device 100, and the second portion may be exposed to the outside. Alternatively, only a portion of the first portion may be inserted into the aerosol generating device 100, or the entire first portion and a portion of the second portion may be inserted into the aerosol generating device 100. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 100. For example, the opening and closing and/or a size of the air passage formed in the aerosol generating device 100 may be adjusted by the user. Accordingly, the amount of smoke and a smoking impression may be adjusted by the user. As another example, the external air may flow into the aerosol generating article 200 through at least one hole formed in a surface of the aerosol generating article 200.

Hereinafter, an example of the aerosol generating article 200 will be described with reference to FIG. 4.

Figure 4:
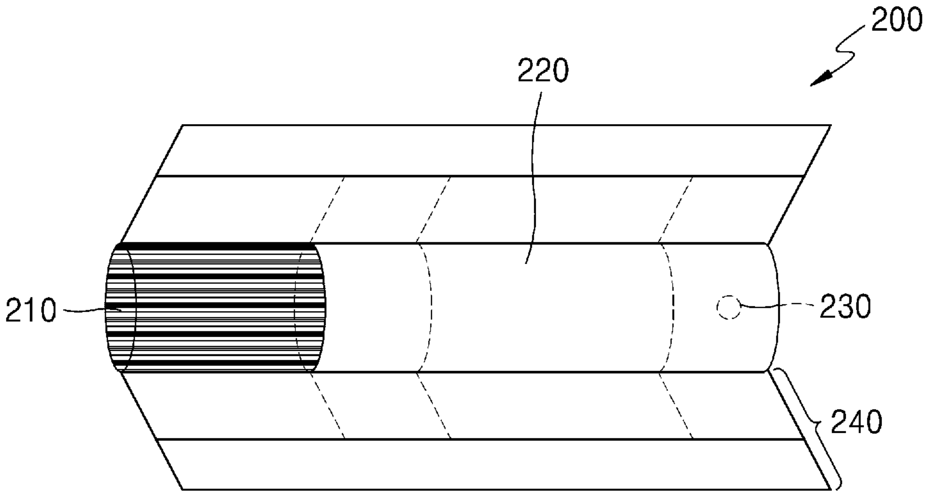
FIG. 4 illustrates an example of the aerosol generating article.

FIG. 4 illustrates an example of an aerosol generating article.

Referring to FIG. 4, the aerosol generating article 200 may include a tobacco rod 210 and a filter rod 220. The first portion described above with reference to FIGS. 1 through 3 may include the tobacco rod 210, and the second portion may include the filter rod 220.

FIG. 4 illustrates that the filter rod 220 includes a single segment. However, the filter rod 220 is not limited thereto. In other words, the filter rod 220 may include a plurality of segments. For example, the filter rod 220 may include a first segment configured to cool an aerosol and a second segment configured to filter a certain component included in the aerosol. Also, according to some embodiments, the filter rod 220 may further include at least one segment configured to perform other functions.

The aerosol generating article 200 may be packaged via at least one wrapper 240.

The wrapper 240 may have at least one hole through which external air may be introduced or internal air may be discharged. For example, the aerosol generating article 200 may be packaged via one wrapper 240. As another example, the aerosol generating article 200 may be doubly packaged via at least two of the wrapper 240. For example, the tobacco rod 210 may be packaged via a first wrapper, and the filter rod 220 may be packaged via a second wrapper. Also, the tobacco rod 210 and the filter rod 220, which are respectively packaged via separate wrappers, may be coupled to each other, and the entire aerosol generating article 200 may be packaged via a third wrapper. When each of the tobacco rod 210 and the filter rod 220 includes a plurality of segments, each segment may be packaged via a separate wrapper. Also, the entire aerosol generating article 200 including the plurality of segments, which are respectively packaged via the separate wrappers and which are coupled to each other, may be re-packaged via another wrapper.

The tobacco rod 210 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 210 may include other additives, such as flavors, a wetting agent, and/or organic acid. Also, the tobacco rod 210 may include a flavored liquid, such as menthol or a moisturizer, which is injected to the tobacco rod 210.

The tobacco rod 210 may be manufactured in various forms. For example, the tobacco rod 210 may be formed as a sheet or a strand. Also, the tobacco rod 210 may be formed as a pipe tobacco, which is formed of tiny bits cut from a tobacco sheet. Also, the tobacco rod 210 may be surrounded by a heat conductive material. For example, the heat-conducting material may be, but is not limited to, a metal foil such as aluminum foil. For example, the heat conductive material surrounding the tobacco rod 210 may uniformly distribute heat transmitted to the tobacco rod 210, and thus, the heat conductivity applied to the tobacco rod may be increased and taste of the tobacco may be improved. Also, the heat conductive material surrounding the tobacco rod 210 may function as a susceptor heated by the induction heater. Here, although not illustrated in the drawings, the tobacco rod 210 may further include an additional susceptor, in addition to the heat conductive material surrounding the tobacco rod 210.

The filter rod 220 may include a cellulose acetate filter. Shapes of the filter rod 220 are not limited. For example, the filter rod 220 may include a cylinder-type rod or a tube-type rod having a hollow inside. Also, the filter rod 220 may include a recess-type rod. When the filter rod 220 includes a plurality of segments, at least one of the plurality of segments may have a different shape.

The filter rod 220 may be formed to generate flavors. For example, a flavoring liquid may be injected onto the filter rod 220, or an additional fiber coated with a flavoring liquid may be inserted into the filter rod 220.

Also, the filter rod 220 may include at least one capsule 230. Here, the capsule 230 may generate a flavor or an aerosol. For example, the capsule 230 may have a configuration in which a liquid containing a flavoring material is wrapped with a film. For example, the capsule 230 may have a spherical or cylindrical shape, but is not limited thereto.

When the filter rod 220 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and is not limited as long as the cooling segment cools the aerosol.

Although not illustrated in FIG. 4, the aerosol generating article 200 according to an embodiment may further include a front-end filter. The front end filter may be a front end plug that is located on one side of the tobacco rod 210 which is opposite to the filter rod 220. The front-end filter may prevent the tobacco rod 210 from being detached outwards and prevent a liquefied aerosol from flowing into the aerosol generating device 100 (FIGS. 1 through 3) from the tobacco rod 210, during smoking.

Figure 5A:
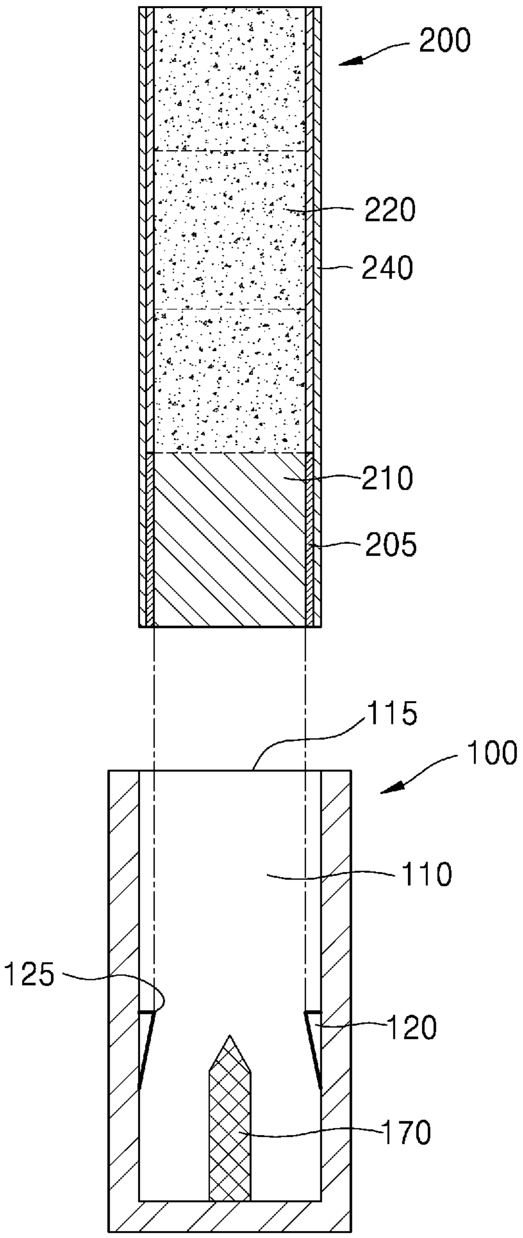
FIG. 5A is an example cross-sectional view schematically showing a state before an aerosol generating article is first inserted into an aerosol generating device according to an embodiment.
Figure 5B:
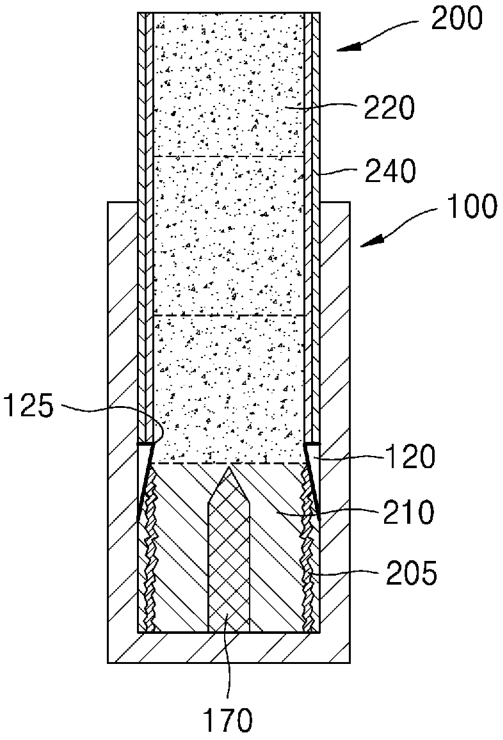
FIG. 5B is an example cross-sectional view schematically showing a state after the aerosol generating article is first inserted into the aerosol generating device according to the embodiment.

FIG. 5A is an example cross-sectional view schematically showing a state before the aerosol generating article 200 is first inserted into the aerosol generating device 100 according to an embodiment, and FIG. 5B is an example cross-sectional view schematically showing a state after the aerosol generating article 200 is first inserted into the aerosol generating device 100 according to an embodiment.

The aerosol generating device 100 according to an embodiment may heat the aerosol generating article 200 including a metal wrapper 205. The aerosol generating device 100 may include an accommodation portion 110 for accommodating the aerosol generating article 200 through an opening 115 and a cutting portion 120 formed in the accommodation portion 110. The cutting portion 120 may cut at least part of the metal wrapper 205 when the aerosol generating article 200 is inserted into the accommodation portion 110. The cutting portion 120 may comprise at least one blade.

The aerosol generating article 200 inserted into the accommodation portion 110 through the opening 115 may include the metal wrapper 205. The metal wrapper 205 may be disposed to surround at least part of the aerosol generating article 200. The metal wrapper 205 may be surrounded by a wrapper 240 of the aerosol generating article 200, for example.

At least one hole through which external air is introduced or internal gas is discharged, may be formed in the wrapper 240 of the aerosol generating article 200. At least part of the aerosol generating article 200 may be overlappingly packaged via the wrapper 240 and the metal wrapper 205, Although not shown, other parts of the aerosol generating article 200 that is not packaged via the metal wrapper 205 may be overlappingly packaged via a plurality of wrappers.

For example, the metal wrapper 205 may surround a tobacco rod 210 of the aerosol generating article 200. In this case, the metal wrapper 205 may be between the tobacco rod 210 and the wrapper 240.

The metal wrapper 205 may be a metal foil, such as an aluminum foil, for example. The metal wrapper 205 may uniformly distribute heat transferred to the tobacco rod 210, and thus, heat conductivity applied to the tobacco rod 210 may be increased and taste of the tobacco may be improved.

Also, the metal wrapper 205 surrounding the tobacco rod 210 may function as a susceptor heated by the induction heater. Here, although not illustrated in the drawings, the tobacco rod 210 may further include an additional susceptor, in addition to the heat conductive material surrounding the tobacco rod 210.

In the drawings, the tobacco rod 210 is arranged at one end of the aerosol generating article 200, However, the position of the tobacco rod 210 within the aerosol generating article 200 is not limited thereto.

The tobacco rod 210 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto.

Also, the tobacco rod 210 may include other additives, such as flavors, a wetting agent, and or organic acid. Also, the tobacco rod 210 may include a flavored liquid, such as menthol or a moisturizer, which is sprayed onto the tobacco rod 210.

The tobacco rod 210 may be manufactured in various forms. For example, the tobacco rod 210 may be formed as a sheet or a strand. Also, the tobacco rod 210 may be formed as a pipe tobacco, which is formed of tiny bits cut from a tobacco sheet.

In the drawings, the metal wrapper 205 surrounds the tobacco rod 210, but the configuration of the metal wrapper 205 may be changed as needed.

The aerosol generating article 200 and the accommodation portion 110 may have corresponding shapes. For example, when the aerosol generating article 200 has a cylindrical shape, the accommodation portion 110 may also have a cylindrical shape to accommodate the aerosol generating article 200. However, the shapes of the aerosol generating article 200 and the accommodation portion 110 are not limited thereto and may be changed as needed.

The aerosol generating device 100 may include a cutting portion 120 formed in the accommodation portion 110. The cutting portion 120 may be formed on an inner surface of the accommodation portion 110. The cutting portion 120 may cut at least part of the metal wrapper 205 of the aerosol generating article 200 when the aerosol generating article 200 is inserted into the accommodation portion 110.

The cutting portion 120 may be formed at a position corresponding to the position of the metal wrapper 205 of the aerosol generating article 200. The cutting portion 120 may protrude from the inner surface of the accommodation portion 110 by a certain distance. When the aerosol generating article 200 is inserted, the cutting portion 120 may cut the metal wrapper 205 as it simultaneously comes into contact with the metal wrapper 205.

When the aerosol generating article 200 is fully inserted into the accommodation portion 110, an end 125 of the cutting portion 120 may be closer to the opening 115 than the metal wrapper 205. That is, when the aerosol generating article 200 is fully inserted into the accommodation portion 110, the end 125 of the cutting portion 120 may be formed at a higher position than the metal wrapper 205 with respect to the longitudinal direction of the accommodation portion 110.

As the end 125 of the cutting portion 120 is closer to the opening 115 than the metal wrapper 205, when the aerosol generating article 200 is inserted, the entire metal wrapper 205 may be cut by the cutting portion 120 in the longitudinal direction.

For example, when the aerosol generating article 200 is inserted, the entire portion of the metal wrapper 205 that comes into contact with the cutting portion 120 may be cut in the longitudinal direction. As the cutting portion 120 may include a pair of cutting portions in the accommodation portion 110 for cutting the metal wrapper 205, the metal wrapper 205 may be cut into a plurality of portions along the circumference.

The cutting portion 120 formed in pairs may face each other. For example, when the cutting portion 120 is formed in one pair, one of the cutting portions and the other cutting portion may face one another on the inner surface of the accommodation portion 110.

As another example, the cutting portion 120 formed in pairs may form a certain angle with respect to each other. The certain angle formed by the pair of the cutting portion 120 with respect to each other may be an acute angle. As long as the cutting portions formed in pairs cut the entire metal wrapper 205 in the longitudinal direction, angles formed by the cutting portions 10 with respect to each other may be changed.

When the metal wrapper 205 is cut by the cutting portion 120, cut surfaces of the metal wrapper 205 may be formed in parallel in the longitudinal direction. The cut surface of the metal wrapper 205 is not limited to the examples shown in the drawings and may be changed as needed.

The cutting portion 120 may be formed in the accommodation portion 110 by a double shot injection molding. That is, after the accommodation portion 110 is formed in an injection molding, the cutting portion 120 may be formed by applying an injection molding method to the accommodation portion 110 so as to be disposed within the accommodation portion 110. Alternatively, after the cutting portion 120 is formed in an injection molding, the accommodation portion 110 may be formed with the cutting portion 120 in an injection molding by placing the cutting portion 120 therein.

The aerosol generating device 100 may include a heater 170 for heating an aerosol generating article. The heater 170 may be disposed within the accommodation portion 110. When the aerosol generating article 200 is accommodated in the accommodation portion 110, the heater 170 may be formed to be inserted into the aerosol generating article 200.

For example, the heater 170 may be formed to be inserted into the tobacco rod 210 of the aerosol generating article 200. Heat of the heater 170 may be transferred to the tobacco rod 210 of the aerosol generating article 200 to heat the aerosol generating article 200.

The heater 170 of the aerosol generating device 100 may be an electro-resistive heater, for example. The heater 170 may include an electrically conductive track, and the heater 170 may be heated when electrical current flows through the electrically conductive track. However, the heater 170 is not limited to the example described above and may include all heaters which may be heated to a desired temperature. Here, the desired temperature may be pre-set in the aerosol generating device 100 or may be set as a temperature desired by a user.

As another example, the heater 170 may include an induction heater. In detail, the heater 170 may include an electrically conductive coil for heating the aerosol generating article 200 in an induction heating manner. An embodiment shown in FIGS. 5A and 5B may be applied to other embodiments, and hereinafter, the same reference numerals may represent components that are substantially the same as the components described above.

Figure 6A:
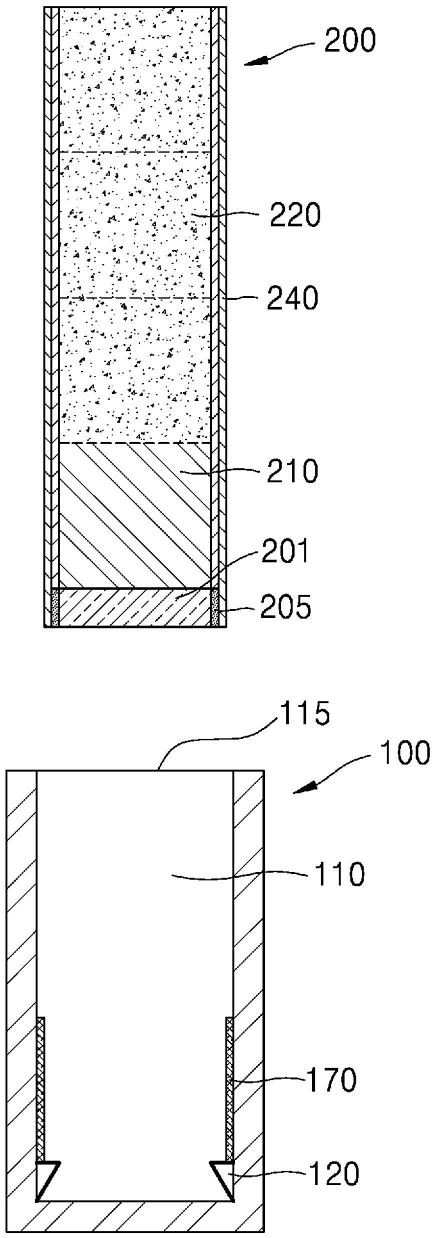
FIG. 6A is another example cross-sectional view schematically showing a state before an aerosol generating article is first inserted into an aerosol generating device according to an embodiment.
Figure 6B:
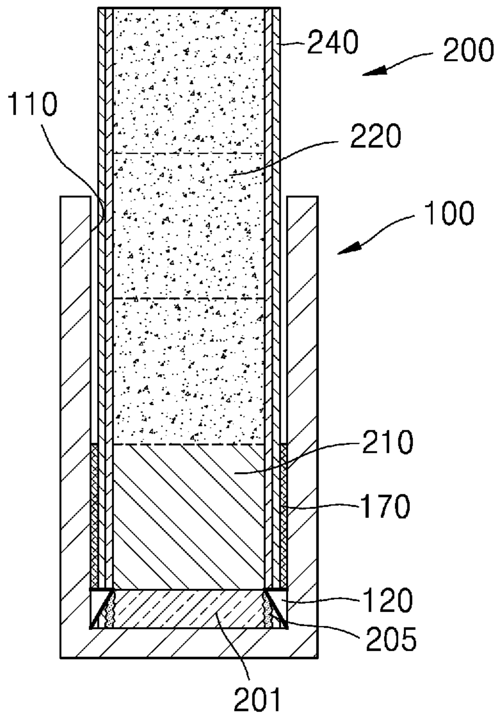
FIG. 6B is another example cross-sectional view schematically showing a state after the aerosol generating article is first inserted into the aerosol generating device according to the embodiment.

FIG. 6A is another example cross-sectional view schematically showing a state before an aerosol generating article is first inserted into an aerosol generating device according to an embodiment, and FIG. 6B is another example cross-sectional view schematically showing a state after an aerosol generating article is first inserted into an aerosol generating device according to an embodiment.

In FIGS. 6A and 6B, the aerosol generating article 200 may further include a front end plug 201 at one side of the tobacco rod 210. At this time, the front end plug 201 may prevent the tobacco rod 210 from deviating outward.

The metal wrapper 205 may surround the front end plug 201. The metal wrapper 205 may be between the front end plug 201 and the wrapper 240. The metal wrapper 205 may be a metal foil, such as an aluminum foil, for example.

When the aerosol generating article 200 is accommodated in the accommodation portion 110, the heater 170 of the aerosol generating device 100 may heat the outside of the aerosol generating article 200.

For example, the heater 170 may heat the tobacco rod 210 of the aerosol generating article 200. That is, when the aerosol generating article 200 is inserted, the heater 170 may be disposed at a position corresponding to the tobacco rod 210. Heat of the heater 170 may be transferred to the tobacco rod 210 from the outside of the aerosol generating article 200 and used to heat the aerosol generating article 200.

The cutting portion 120 may be formed at a position corresponding to the position of the metal wrapper 205 of the aerosol generating article 200. That is, when the aerosol generating article 200 is inserted, the cutting portion 120 may be disposed at a position corresponding to the front end plug 201. The cutting portion 120 may be located under the heater 170. When the aerosol generating article 200 is inserted, the cutting portion 120 may cut the metal wrapper 205 as it simultaneously comes into contact with the metal wrapper 205.

Figure 7A:
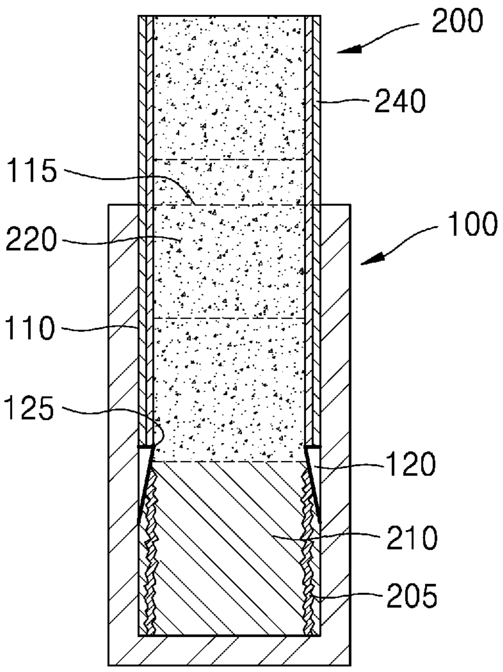
FIG. 7A is a cross-sectional view showing a first example aspect of a cutting portion of an aerosol generating device according to an embodiment.
Figure 7B:
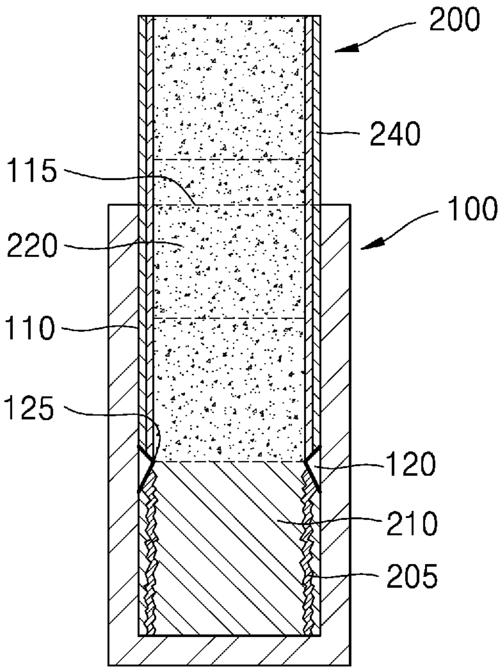
FIG. 7B is a cross-sectional view showing a second example aspect of a cutting portion of an aerosol generating device according to an embodiment.

FIGS. 7A and 7B are cross-sectional views showing an example aspect of a cutting portion 120 of an aerosol generating device 100 according to embodiments.

An end 125 may be formed on the cutting portion 120. The end 125 of the cutting portion 120 that is a pointed end part of the cutting portion 120 may be a part that comes into contact with the metal wrapper 205 to cut the metal wrapper 205 when the aerosol generating article 200 is inserted into the aerosol generating device 100.

Referring to FIG. 7A, the end 125 of the cutting portion 120 may be formed to face the opening 115. An upper surface of the cutting portion 120 extending from the end 125 of the cutting portion 120 may be disposed in parallel to the opening 115. A lower surface of the cutting portion 120 extending from the end 125 of the cutting portion 120 may be inclined downward in a direction away from the center of the accommodation portion 110. Thus, the end 125 of the cutting portion 120 may be closest to a central axis of the accommodation portion 110, than a remainder of the cutting portion 120.

Referring to FIG. 7B, the end 125 of the cutting portion 120 may be formed to face the center of the accommodation portion 110. The upper surface of the cutting portion 120 extending from the end 125 of the cutting portion 120 may be inclined upward in a direction away from the center of the accommodation portion 110. The lower surface of the cutting portion 120 extending from the end 125 of the cutting portion 120 may be inclined downward in a direction away from the center of the accommodation portion 110. The end 125 of each of the pair of the cutting portion 120 may be disposed to be closest to the central axis of the accommodation portion 110, than a remainder of the cutting portion 120.

MODE FOR THE INVENTION

Figure 8A:
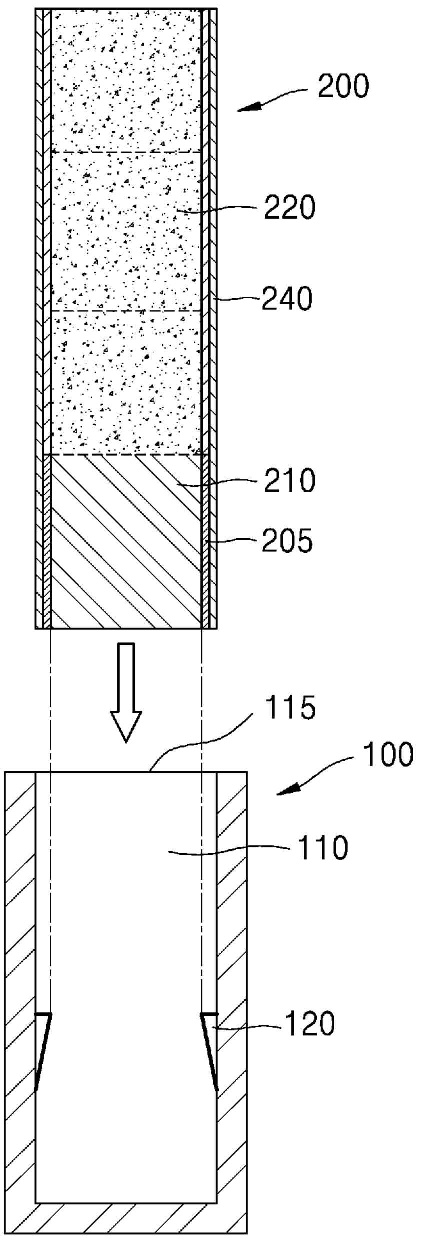
FIG. 8A is a cross-sectional view schematically showing an aerosol generating device according to another embodiment when an aerosol generating article is inserted into the aerosol generating device.
Figure 8B:
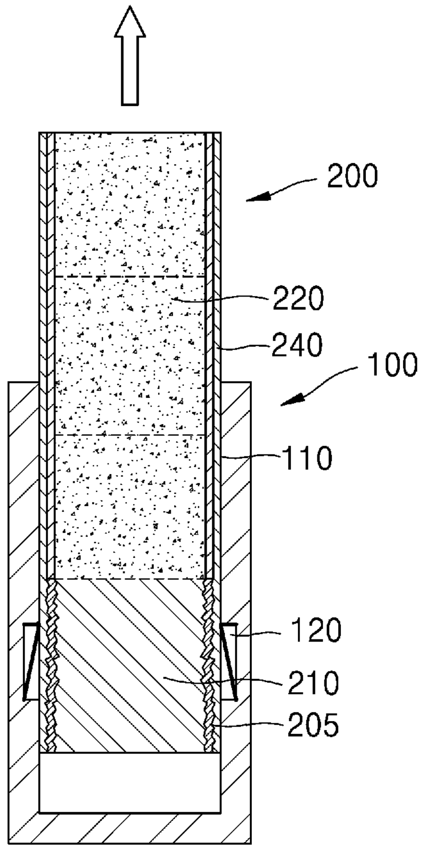
FIG. 8B is a cross-sectional view schematically showing the aerosol generating device according to the another embodiment when the aerosol generating article is removed from the aerosol generating device.

FIGS. 8A and 8B are cross-sectional views schematically showing an aerosol generating device 100 according to another embodiment when the aerosol generating article 200 is inserted into or removed from the aerosol generating device 100.

Referring to FIG. 8A, a cutting portion 120 of the aerosol generating device 100 according to another embodiment may be exposed when the aerosol generating article 200 is inserted into the aerosol generating device 100. That is, the aerosol generating device 100 according to another embodiment may detect insertion of the aerosol generating article 200 and may expose the cutting portion 120 when detecting insertion of the aerosol generating article 200.

For example, insertion of the aerosol generating article 200 may be detected by detecting changes in a magnetic field generated when the aerosol generating article 200 is inserted into the aerosol generating device 100. A metal wrapper 205 may be included in the aerosol generating article 200, and a magnetic field sensor may be included in the aerosol generating device 100.

When the aerosol generating article 200 including the metal wrapper 205 is inserted into the aerosol generating device 100, the magnetic field in the accommodation portion 110 of the aerosol generating device 100 may be changed, and the magnetic field sensor may measure changes in the magnetic field in the accommodation portion 110. When insertion of the aerosol generating article 200 is detected according to changes in the magnetic field, the aerosol generating device 100 may expose the cutting portion 120.

The cutting portion 120, when exposed, may be located at a position corresponding to the position of the metal wrapper 205 of the aerosol generating article 200. For example, the cutting portion 120 may be exposed toward an inner space by protruding from an inner surface of the accommodation portion 110 by a certain distance. The cutting portion 120, when exposed, may cut the metal wrapper 205 when the aerosol generating article 200 is inserted into the aerosol generating device 100.

Referring to FIG. 8B, the cutting portion 120 of the aerosol generating device 100 according to the another embodiment may be concealed when the aerosol generating article 200 is being removed from the aerosol generating device 100. That is, the aerosol generating device 100 according to another embodiment may detect removal of the aerosol generating article 200 and may conceal the cutting portion 120 when detecting removal of the aerosol generating article 200. For example, the cutting portion 120 may be concealed by being inserted into a housing of the aerosol generating device 100.

Removal of the aerosol generating article 200 may be detected by measuring changes in a magnetic field generated when the aerosol generating article 200 is being removed from the aerosol generating device 100, for example. According to the another embodiment, the metal wrapper 205 may be included in the aerosol generating article 200, and a magnetic field sensor may be included in the aerosol generating device 100.

When the aerosol generating article 200 including the metal wrapper 205 is being removed, the magnetic field in the accommodation portion 110 of the aerosol generating device 100 may be changed, and the magnetic field sensor may measure changes in the magnetic field in the accommodation portion 110. When removal of the aerosol generating article 200 is detected according to changes in the magnetic field, the aerosol generating device 100 may conceal the cutting portion 120.

As an example, exposure or concealment of the cutting portion 120 may be performed by a motor installed at one side of the cutting portion 120. When insertion or removal of the aerosol generating article 200 is detected, the aerosol generating device 100 may operate the motor. The motor may move or rotate the cutting portion 120 by a certain distance. Thus, the cutting portion 120 may be exposed or concealed.

As another example, exposure or concealment of the cutting portion 120 may be performed by changing the magnetic field acting on the cutting portion 120. At this time, a magnet may be attached to the cutting portion 120, When insertion or removal of the aerosol generating article 200 is detected, the aerosol generating device 100 may change the magnetic field acting on the cutting portion 120, and the cutting portion 120 may be moved or rotated according to changes in the magnetic field. As the cutting portion 120 is moved or rotated, the cutting portion 120 may be exposed or concealed.

Figure 9:
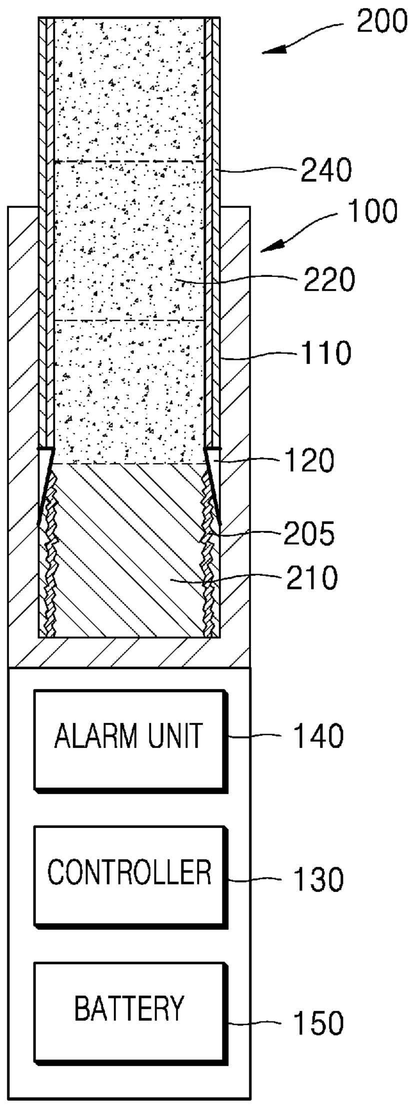
FIG. 9 is a cross-sectional view schematically showing an aerosol generating device according to another embodiment.

FIG. 9 is a cross-sectional view schematically showing an aerosol generating device 100 according to another embodiment.

The aerosol generating device 100 according to another embodiment may further include a battery 150 and a controller 130.

The battery 150 may supply power used to operate the aerosol generating device 100. For example, the battery 150 may supply power to heat a heater for transferring heat to the aerosol generating article 200. Also, the battery 150 may supply power required to operate a sensor, a motor, or the like that may be installed in the aerosol generating device 100.

The controller 130 may control an overall operation of the aerosol generating device 100. In detail, the controller 130 may control the battery 150 to operate the aerosol generating device 100. The controller 130 may control operation of other components included in the aerosol generating device 100. Also, the controller 130 may check the state of each of the components of the aerosol generating device 100, thereby determining whether the aerosol generating device 100 is in an operable state.

The controller 130 may include at least one processor. A processor can be implemented as an array of a plurality of logic gates or can be implemented as a combination of a general-purpose microprocessor and a memory in which a program executable in the microprocessor is stored. In addition, it can be understood by those of ordinary skill in the art to which the present embodiment belongs may be implemented with other types of hardware.

The controller 130 may be electrically connected to the cutting portion 120 to control operation of the aerosol generating device 100. For example, when the aerosol generating article 200 is inserted into the aerosol generating device 100 according to another embodiment, the cutting portion 120 may cut at least part of the metal wrapper 205. In this case, the cutting portion 120 and the metal wrapper 205 may come into contact with each other so that a normal use signal may be generated. For example, contact between the cutting portion 120 and the metal wrapper 205 may complete an electrical circuit pathway to the controller 130 such that an electrical signal, including the normal use signal, is received by the controller 130 via the cutting portion 120 and the metal wrapper 205. The controller 130 may determine whether the normal use signal is received based on at least one characteristic of the signal.

The normal use signal may be generated when the aerosol generating article 200 is first inserted into the accommodation portion 110. That is, the metal wrapper 205 may be cut via the cutting portion 120 as the metal wrapper 205 comes into contact with the cutting portion 120, The normal use signal may be generated according to the contact between the metal wrapper 205 and the cutting portion 120. The normal use signal may be an electrical current for a certain time or longer or an amount of the electrical current with a certain value or more. For example, the controller 130 may determine that the normal use signal is received based on the electrical signal including the electrical current for the certain time or longer or the amount of the electrical current with the certain value or more.

As an example, when the normal use signal is previously set (e.g. defined by the controller 130) as an electrical current for a certain time or longer, electrical current for the certain time or longer may be classified (e.g. determined by the controller 130) as the normal use signal, and electrical current for a certain time or less (including 0) may be classified as a noise signal.

As another example, when the normal use signal is previously set (e.g. defined by the controller 130) as an amount of electrical current with a certain value or more, the amount of current with a certain value or more may be classified (e.g. determined by the controller 130) as the normal use signal, and the amount of current of a certain value or less (including 0) may be classified as a noise signal. The normal use signal and the noise signal may be classified based on a plurality of criteria, including the above-described examples.

The normal use signal may be a signal generated when the aerosol generating article 200 is first inserted into the accommodation portion 110, and the noise signal may be a signal generated when the aerosol generating article 200 is re-inserted into the accommodation portion 110. The normal use signal and the noise signal may be classified according to a certain criterion set to distinguish initial insertion and re-insertion of the aerosol generating article 200, and this is not limited by the above-described examples.

When, as the aerosol generating article 200 is first inserted into the accommodation portion 110, the cutting portion 120 comes into contact with the metal wrapper 205 to generate the normal use signal, the controller 130 electrically connected to the cutting portion 120 may receive the normal use signal transmitted from the cutting portion 120.

For example, when the normal use signal is previously set as an electrical current with a certain time or longer, the controller 130 may determine that the normal use signal is received based on receiving the electrical current flow with the certain time or longer from the cutting portion 120, When the normal use signal is transmitted from the cutting portion 120, the controller 130 may allow the aerosol generating device 100 to be operated.

When, as the aerosol generating article 200 is re-inserted into the accommodation portion 110, the normal use signal is not transmitted from the cutting portion 120 (when the noise signal is transmitted), the controller 130 may recognize the reuse of the aerosol generating article 200 and may block operation of the aerosol generating device 100.

For example, when the normal use signal is previously set as an electrical current for a certain time or longer, the controller 130 may determine that the noise signal is received based on receiving the electrical current for the certain time or less (including 0) from the cutting portion 120. When the normal use signal is not transmitted from the cutting portion 120 and the noise signal is transmitted, the controller 130 may block operation of the aerosol generating device 100.

Transmission of the normal use signal from the cutting portion 120 to the controller 130 may be one of conditions under which the aerosol generating device 100 may operate normally. That is, normal operation of the aerosol generating device 100 may be determined depending on whether the normal use signal is transmitted from the cutting portion 120 to the controller 130.

As an example, when the normal use signal is not transmitted from the cutting portion 120 to the controller 130, the controller 130 may control power output of the battery 150, thereby blocking normal operation of the aerosol generating device 100.

As another example, when the normal use signal is not transmitted from the cutting portion. 120 to the controller 130, the controller 130 may generate an alarm signal notifying the user of the reuse of the aerosol generating article 200.

The aerosol generating device 100 may further include an alarm unit 140. The alarm unit 140 may be at least one of a vibration unit (e.g. a vibration actuator), a speaker unit (e.g. a speaker), and a display unit (e.g. a display), and the alarm unit 140 may be mounted on the aerosol generating device 100 to notify the user of the state of the aerosol generating device 100. The alarm unit 140 may transmit to the user at least one of vibration, sound, and an optical output according to the alarm signal of the controller 130.

For example, the display unit may be mounted as the alarm unit 140 in the aerosol generating device 100. At this time, as the aerosol generating article 200 is re-inserted, when the normal use signal to the controller 130 is not transmitted, the controller 130 may generate an alarm signal notifying the user of the reuse of the aerosol generating article 200.

The alarm signal generated by the controller 130 may be transmitted to the display unit that is the alarm unit 140, and the display unit may transmit an optical signal notifying the user of the reuse of the aerosol generating article 200. In this case, the optical signal may be a certain image or text through which the user may recognize the reuse of the aerosol generating article 200.

When the aerosol generating article 200 is first inserted into the aerosol generating device 100 according to one or more embodiments, the aerosol generating device 100 according to the one or more embodiments may cut at least a part of the metal wrapper 205, thereby detecting re-insertion and reuse of the aerosol generating article 200. In this case, re-insertion and reuse of the aerosol generating article 200 may be classified by measuring electrical signals according to contact between the metal wrapper 205 and the cutting portion 120.

When the reuse of the aerosol generating article 200 is detected, the aerosol generating device 100 may be blocked from operation. Alternatively or additionally, the reuse of the aerosol generating article 200 may be notified to the user through the alarm unit 140 installed in the aerosol generating device 100.

The reuse of the aerosol generating article 200 is blocked so that the user's dissatisfaction due to changes in the flavor of an aerosol generated from the reuse may be prevented.

An aerosol generating system according to another embodiment may include an aerosol generating device and an aerosol generating article 200 accommodated in the aerosol generating device 100 and including the metal wrapper 205.

The configuration and the effect of the aerosol generating device 100 of the aerosol generating system may be the same as those of the aerosol generating device 100 according to the above-described embodiments and thus, a detailed description in an overlapping range will be omitted.

The aerosol generating article 200 of the aerosol generating system may include the metal wrapper 205.

Those of ordinary skill in the art related to the present embodiments may understand that various changes in form and details can be made therein without departing from the scope of the disclosure. The disclosed methods should be considered in a descriptive sense and not for purposes of limitation.

INDUSTRIAL APPLICABILITY

One or more embodiments of the present disclosure relate to an aerosol generating device including a cutting portion for cutting at least part of a metal wrapper of an aerosol generating article.

The invention claimed is:

1. An aerosol generating device that heats an aerosol generating article including a metal wrapper, the aerosol generating device comprising:

an accommodation portion configured to accommodate the aerosol generating article through an opening of the aerosol generating device; and a cutting portion disposed in the accommodation portion, wherein the cutting portion is configured to cut at least part of the metal wrapper when the aerosol generating article is inserted into the accommodation portion, and wherein the cutting portion is configured to come into contact with the metal wrapper and cut at least a part of the metal wrapper when the aerosol generating article is first inserted into the accommodation portion, such that a normal use signal is generated.

2. The aerosol generating device of claim 1, wherein the metal wrapper comprises an aluminum foil.

3. The aerosol generating device of claim 1, wherein an end of the cutting portion is provided such that, when the aerosol generating article is fully inserted into the accommodation portion, the end of the cutting portion is closer to the opening than the metal wrapper.

4. The aerosol generating device of claim 1, wherein the cutting portion includes a pair of cutting portions in the accommodation portion.

5. The aerosol generating device of claim 4, wherein the cutting portion is formed in the accommodation portion by a double shot injection molding.

6. The aerosol generating device of claim 1, wherein an end of the cutting portion is located to face the opening of the accommodation portion.

7. The aerosol generating device of claim 1, wherein the cutting portion is exposed when the aerosol generating article is inserted into the aerosol generating device.

8. The aerosol generating device of claim 1, further comprising a controller electrically connected to the cutting portion to receive an electrical signal from the cutting portion, wherein the controller is configured to determine that the normal use signal is received based on the electrical signal including an electrical current for a predetermined time or longer, or an amount of the electrical current with a predetermined value or more.

9. The aerosol generating device of claim 1, further comprising a controller electrically connected to the cutting portion to receive the normal use signal from the cutting portion, wherein the controller is configured to determine that the normal use signal is received.

10. The aerosol generating device of claim 9, wherein the controller is further configured to block operation of the aerosol generating device based on not receiving the normal use signal.

11. The aerosol generating device of claim 9, wherein the controller is further configured to generate an alarm signal notifying a user of reuse of the aerosol generating article based on not receiving the normal use signal.

12. The aerosol generating device of claim 11, further comprising an alarm unit comprising at least one from among a vibration unit, a speaker unit, and a display unit, wherein the alarm unit transmits to the user at least one from among vibration, sound, and an optical output according to the alarm signal of the controller.

13. The aerosol generating device of claim 9, wherein the cutting portion is configured to cut the part of the metal wrapper when the aerosol generating article is first inserted into the accommodation portion such that, in a case where the aerosol generating article is removed and reinserted into the aerosol generating device, another signal that is different from the normal use signal is generated, and the controller is further configured to receive the another signal and block operation of the aerosol generating device based on receiving the another signal.

14. An aerosol generating system comprising:

the aerosol generating device of claim 1; and an aerosol generating article accommodated in the aerosol generating device and comprising a metal wrapper.

* * * * *